United States Patent [19]

Tamamori

[11] Patent Number: 4,951,516
[45] Date of Patent: Aug. 28, 1990

[54] FORCE MULTIPLICATION MECHANISM

[75] Inventor: Hideo Tamamori, Suzurandai, Japan

[73] Assignee: Nippon Air Brake Co., Ltd., Kobe, Japan

[21] Appl. No.: 393,616

[22] Filed: Aug. 14, 1989

[30] Foreign Application Priority Data

Aug. 22, 1988 [JP] Japan ................. 63-208615

[51] Int. Cl.[5] ............................................. F16H 27/02
[52] U.S. Cl. ........................................ 74/110; 74/130; 74/141.5; 188/153 R
[58] Field of Search ............... 74/110, 130, 141.5, 74/149–151; 188/74, 75, 153 R, 198

[56] References Cited

U.S. PATENT DOCUMENTS

| | | | |
|---|---|---|---|
| 1,427,223 | 8/1922 | Miller | 74/130 |
| 3,416,635 | 12/1968 | Salton | 188/153 R |
| 3,430,739 | 3/1969 | Persson et al. | 188/153 R |
| 3,884,333 | 5/1975 | Dubois et al. | 188/153 R |

FOREIGN PATENT DOCUMENTS 0132467 9/1984 Japan .

*Primary Examiner*—Leslie A. Braun
*Assistant Examiner*—Winnie Yip
*Attorney, Agent, or Firm*—G. J. Falce

[57] ABSTRACT

A force transfer mechanism including a force lever through which an input force is transmitted to an output member with mechanical advantage only after the output member encounters sufficient resistance to overcome a friction connection between an input member and the output member indicative of the input member having moved from a retracted position to an operative position. The resultant movement of the input member relative to the output member in the absence of the frictional connection therebetween allows the input member to engage the end of force lever that is normally spaced-apart therefrom and to accordingly drive the output member with a force corresponding to the input force multiplied by the ratio of the force lever only in the operative position of the input member.

11 Claims, 3 Drawing Sheets

FORCE MULTIPLICATION MECHANISM

BACKGROUND OF THE INVENTION

This invention relates to a mechanism which can be combined with a lever to generate an output force greater than that on the drive side, and more particularly to a mechanism that provides such a force output after the drive member is driven forward and its forward resistance is increased during its stroke.

The lever is the most common mechanism used to obtain force amplification in order to generate an output force greater than the input force of the drive part. For example, it is used in driving the brake shoe in a railroad car brake system. (See Utility Model Kokai No. 59-132467.)

When the input force is increased by a lever mechanism, the amount of displacement at the power (or input) point naturally becomes greater than the amount of displacement at the action (or output) point by the lever ratio. However, in driving a brake shoe, it is only after the brake shoe engages the wheel that the large output force is required. The force required during the time the brake shoe is separated from the wheel until it contacts the wheel, can be simply the amount necessary to move it, and it is not necessary to generate a higher force by means of a lever during this time. However, in known brake systems, as in Utility Model Kokai No. 59-132467, for example, the output rod of the pneumatic cylinder is connected to the power point of the force lever and the action point is fitted to the brake push rod. Since the brake shoe is separated from the wheel when the brake is not working, it is driven such that a large output force is generated by the lever even during the time prior to the brake shoe touching the wheel. In the brake system, the necessary stroke of the push rod is not so large, but the driving stroke becomes quite large because of the above-mentioned lever ratio. Therefore it is difficult to obtain compact packaging because the movement until the brake shoe touches the wheel is done through a force amplifying lever.

In addition, in general, very often a certain amount of stroke is necessary until the pressing parts contacts the object, although the pressing stroke is not so large if the pressing part is strongly pressed against the objective item. For example, in a press, very often the workability is better when the space between the upper metal mold and lower metal mold is relatively large.

SUMMARY OF THE INVENTION

The object of the invention is to provide a mechanism including a force multiplying lever for transmitting an input force from an actuator member to a driven member such that the force multiplying lever is inactive until such time as the driven member encounters resistance indicative of the driven member having engaged a force receiving member.

Briefly, the foregoing objective is attained through a force transfer mechanism including an actuator member that is movable from a retracted position to an operative position when an input force is applied, a push rod frictionally connected to the actuating member during movement of the actuator member until such time as the push rod encounters resistance that is greater than the friction force between the actuator member and push rod, and a force lever angularly disposed relative to the push rod and engageable therewith at a location intermediate the ends of the lever, the lever having a fulcrum point at one end and being engageable with the actuator member at its other end to transmit the input force to the push rod with force multiplication subsequent to the push rod encountering resistance greater than the friction force between the actuator member and push rod.

BRIEF DESCRIPTION OF THE DRAWINGS

This object and other objects and advantages of the invention will become apparent from the following more detailed explanation when taken in conjunction with the drawings in which.

DESCRIPTION AND OPERATION

Figure 1:
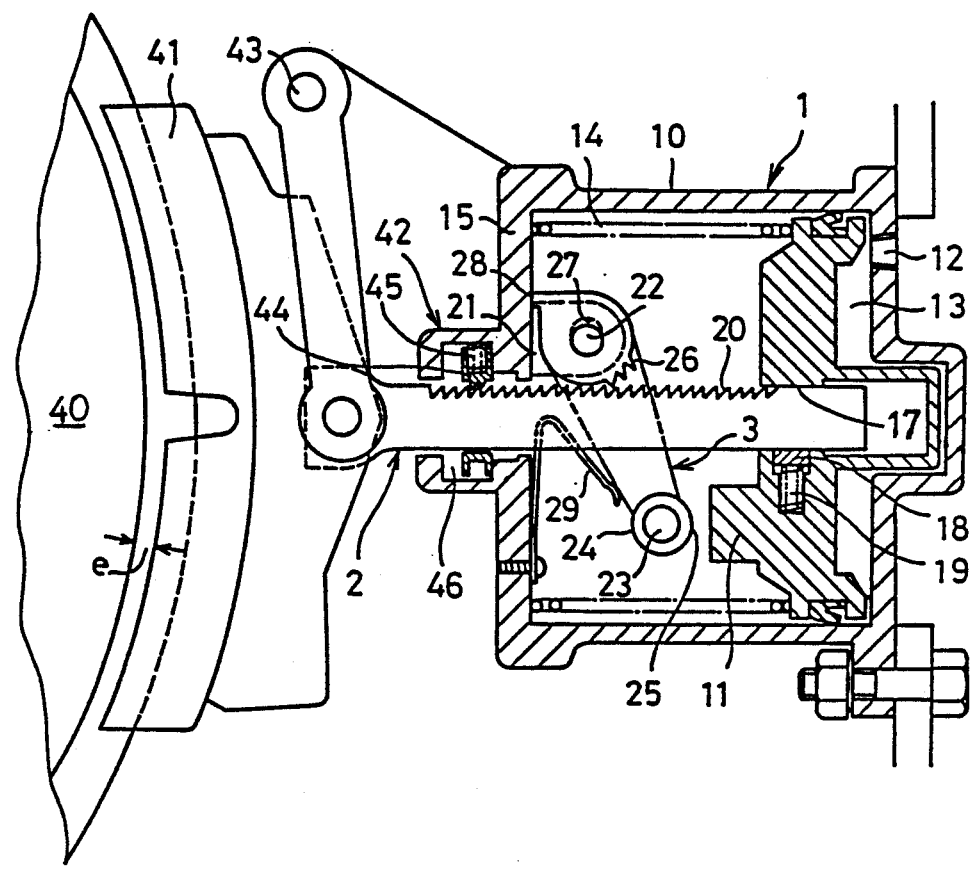
FIG. 1 a sectional elevation view of a railway vehicle brake unit as one example of a device in which the features of the invention may be embodied, the brake unit components shown in a brake release position.
Figure 2:
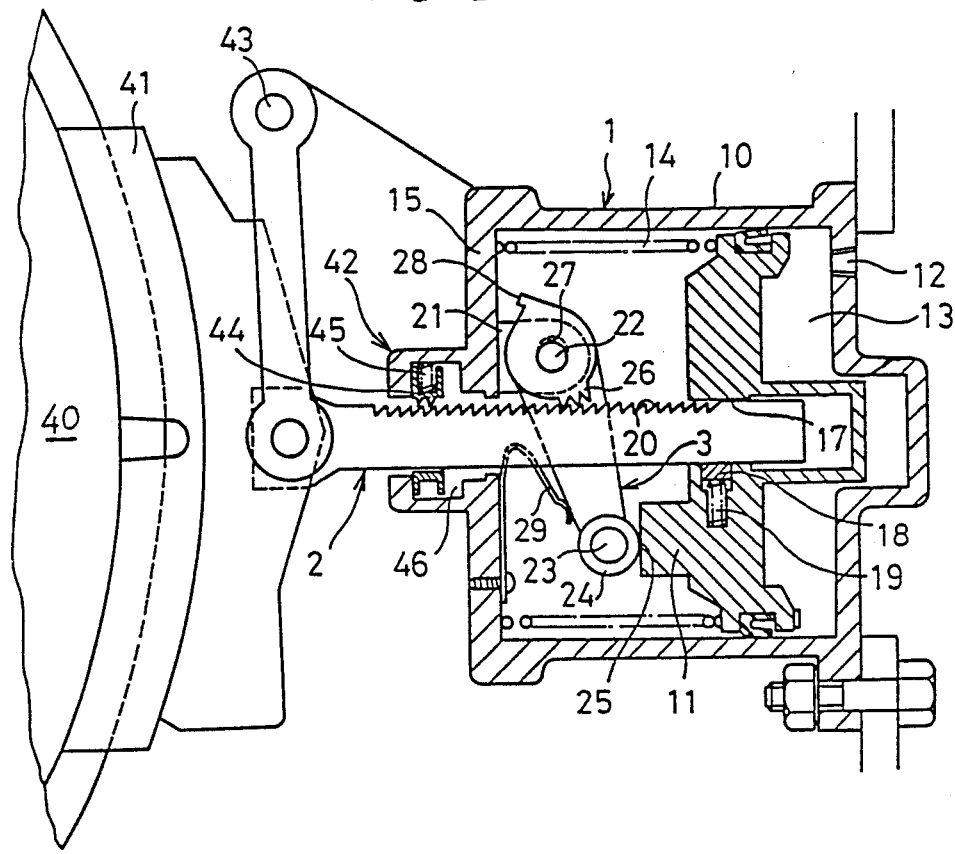
FIG. 2 is a sectional elevation view of the brake unit of FIG. 1 shown in its applied condition.

The first example is shown in FIG. 1 and FIG. 2. This example is used in the brake system of a railroad car. In the figures, 1 is a pneumatic cylinder which is the movement driving part, 2 is a push rod, and 3 is a force lever.

The pneumatic cylinder 1 includes a piston 11 that is housed inside the cylinder main body 10. In the release position shown in FIG. 1, when the compressed air is supplied from the inlet-outlet 12 into the pressure chamber 13, the piston 11 moves forward to the left against the return spring 14, and assumes the applied position illustrated in FIG. 2. When the compressed air is discharged from the pressure chamber 13, the piston 11 returns to the right due to the reaction of the return spring 14, and assumes the release position illustrated in FIG. 1. At this time, the piston 11 is a part of the movement driving part, but it is also an intermediate body.

As can be seen in FIG. 1, the push rod 2 penetrates the left end wall 15 of the cylinder main body 10 along the axis of the cylinder main body 10, so that it can move forward and backward. A brake shoe 41 is connected to this penetrating end of push rod 2. The other end of push rod 2 enters into the inner hole 17 of the piston 11, of which the right end inside the cylinder main body 10 backtracks. The inner hole 17 and the push rod 2 are frictionally connected in the axial direction of the piston 11. The frictional connection has the structure in which the friction member 18 is pressed against push rod 2 by means of a spring 19. If the resistance is large, the push rod 2 and the friction member 18 slide over each other, and the piston 11 moves by itself. In addition, as can be seen in the figure, there is a rack of gear teeth, which is the meshing part 20 intermediate the ends of push rod 2. These teeth are sawtooth-shaped, as can be seen in the figure, one surface of the sawtooth-shaped teeth being sloped relative to the axis of push rod 2 and the other surface being normal thereto.

The lever 3 is located near the end wall cylinder main body 10, and its one end is supported by a fulcrum pin 22 that is carried in a supporting part 21 that protrudes inwardly from the end wall 15. The lever extends downward along the side of the push rod 2, and its extended end supports a roller 24 by means of a pin axle 23, which is parallel to the fulcrum pin 22, to form the power point part 25. When the piston 11 in FIG. 1 moves forward, to the left in the figure, it engages this power point part 25. In addition, there is a meshing part 26, in the form of a sector gear having teeth along the circumference of a boss at the end of lever 3 supported by fulcrum pin 22. These sector gear teeth mesh with the teeth of the rack on the push rod 2. The shape of the teeth is the same sawtooth shape as those of the rack, and the position where the teeth mesh becomes the action point part.

The sector gear teeth securely mesh with the teeth of the gear rack when the power point part 25 of the lever 3 is pushed forward by the piston 11, but when the push rod 2 is moving forward prior to engagement of piston 11 with lever 3 at power point 25, the sloped side of the teeth of the meshing parts engage, and the lever 3 is pushed up to release the meshing. For this purpose, the pin hole 27 of the supporting part 21, which supports the fulcrum pin 22, has an oblong shape, being enlarged generally in a vertical direction, as viewed in the drawing. In the figures, 28 is a stopper provided on the lever 3, and 29 is a leaf spring. In FIG. 1, the lever 3 is normally maintained in a stand-by state in the position established by the stopper 28 under the influence of leaf spring 29.

In the figures, 40 is a wheel, which, for example, is a force receiving member, 42 is a space adjuster, and 43 is a hanger on which the brake shoe 41 is suspended for engagement with the tread of wheel 40 in response to the force applied to push rod 2.

In a brake system constructed in this manner, when the compressed air is supplied from the inlet-outlet 12 in the state of FIG. 1, the piston moves forward and assumes the position illustrated in FIG. 2. Concerning this process, when the piston 11 starts to move forward, the forward movement has almost no resistance, since the brake shoe 41 of the push rod 2 is separated from the wheel 40; therefore the piston 11 moves forward carrying the push rod 2 which is frictionally engaged with it. When the brake shoe 41 touches the wheel 40, the forward movement of the push rod 2 stops, and only the piston 11 moves forward, and the front surface of the piston 11 engages the power point part 25 of the lever 3, and it pushes the power point part. Consequently, the lever 3 rotates around the fulcrum axis 22, in turn rotating the teeth on the sector gear part 26. With the teeth of the rack and sector gear thus meshed, lever 3 drives the push rod 2 forward with force amplification; therefore, it assumes the position illustrated in FIG. 2 and generates the braking force.

When compressed air is discharged from the inlet-outlet 12, in almost the reverse order of the above-mentioned order, the components return to the state of FIG. 1 by the reaction of return spring 14 and the leaf spring 29.

The space adjuster 42 will now be explained. It is located on the end wall 15 of the cylinder, and has a ratchet 44 which meshes with the teeth formed on the gear rack of the meshing part 20 of the push rod 2. The ratchet 44 stops (or limits) the rearward movement of the push rod 2, namely, to the right as viewed in the figure. The ratchet 44 is pressed by the spring 45 in a way to mesh its teeth with the teeth of the rack, and is stored in the adjusting chamber 46 so that it can move axially a distance equal to the space between the wheel 40 and the retracted brake shoe 41, in the applied direction of movement of the push rod 2. This space adjuster 42 maintains the space e between the wheel 40 and the retracted brake shoe 41 substantially constant, by limiting the rearward movement of the push rod 2, as the brake shoe wears out during use. By the way, the distance between the power point part 25 of the lever 3 and the front end surface of the piston 11 is slightly larger than the distance e between the above-mentioned wheel 40 and the brake shoe 41.

Figure 3:
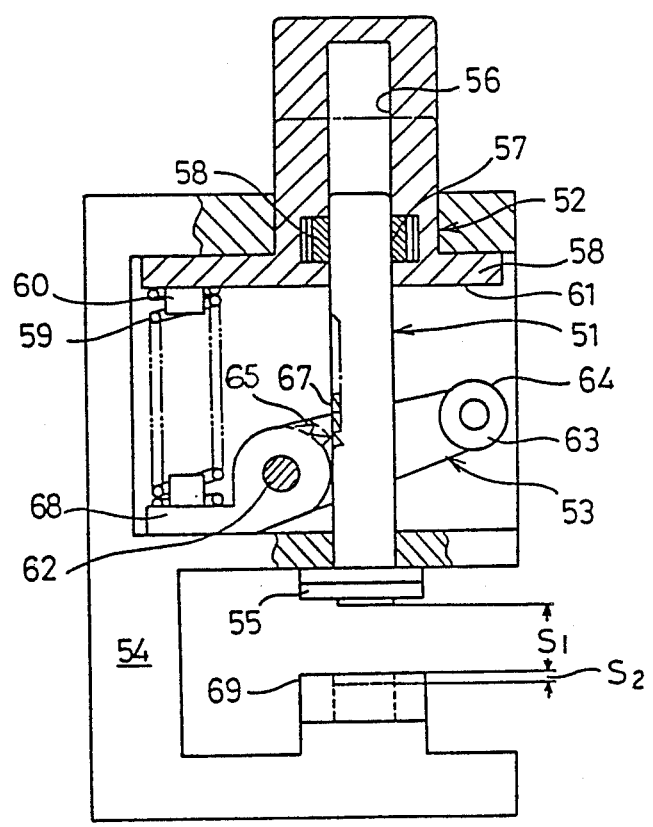
FIG. 3 is an elevation view of a punch press shown partially in section, as an alternate example of a device in which the features of the invention may be embodied.

In the example of FIG. 3 in which the features of the invention are embodied in a punch press or the like device, 51 is the push rod, 52 is the intermediate body, and 53 is the lever.

The push rod 51 is supported by a frame 54 so that it can move in an up and down direction, and the upper metal mold 55 is installed in its lower end as the forming die part.

The intermediate body 52 is supported by the frame 54 in the same moving direction as the push rod 51, and it has an inner hole 56 into which the rear end of the pressing rod 51 fits so that it can slide, and there is a friction-meshing part 57 in this inner hole 56. The friction-meshing part 57 comprises a friction member 58 which bears against the inner surface of the inner hole 56 and acts on the outer surface of the push rod 51. When the push rod 51 is not receiving great resistance in the actuating direction, it moves in unison with movement of the intermediate body 52, and when the resistance becomes great, the friction-meshing part slides relative to the push rod 51 such that the intermediate body moves independently of push rod 2. The upper part of this intermediate body 52 is designed as a plunger, and it is fitted in the cylinder not shown in the figure, and the driving part is connected to it. There is a flange shaped part 58 at the lower end of the intermediate body 52, and it is formed into an upper end supporting part 60 of the return spring 59 and a contacting part 61 which contacts the power point part 64, which will be described below.

The lever 53 is supported by a fulcrum pin 62 located on the frame 54, and its end, which extends in a diagonally upward direction, passing by the side of the pressing rod 51, has a roller 63 that provides the power point part 64. The lever 53 has an arcuate sector of teeth that serve as the meshing part 65. These teeth lie along the circumference of a boss at the one end of lever 3 in which the fulcrum pin 62 is carried. The push rod 51 is equipped with a toothed gear which is the meshing part 67 that meshes with the meshing part 65. In addition, the lever 53 has a lower end supporting part 68, which extends to the lower end position of the return spring 59, and the lower surface of the lower end supporting part 68 is in contact with the frame 54.

In the FIG. 3, 69 is the lower metal mold of the forming die, and it is installed on the frame 54.

When the intermediate body 52 is driven downwardly by the drive means from the state indicated in this FIG. 3, the push rod 51 goes down together with it, and when the upper metal mold 55 touches a work piece placed on the lower metal mold 69, the lowering resistance of the push rod becomes great, so that the friction-meshing part 57 slides relative to push rod 51. This permits the intermediate body 52 to move down independently of push rod 51 until the contact part 61 touches the power point part 64 and pushes it down. When the power point part 64 is pushed down, the lever 53 rotates around the fulcrum axis 62, and the meshing part 65, which is the work point, transfers the pressing force of the driving part, which is multiplied by the lever ratio, into the pressing rod 51 via the meshing part 67, so that the press-processing work can be done. When the force of the driving part is removed after the processing work, it returns to the state indicated in the figure by the return spring 59.

In this embodiment, if the distance from the upper metal mold 55 in the ascending position until it touches the work after coming down, is $S_1$, and the lowering distance required to do the processing is $S_2$, and the lever ratio of the lever 53 is $(\alpha)$, as was described earlier, the stroke can be shortened by $(\alpha - 1) S_1$, compared with the case in which the upper metal mold 55 is driven over the distance $S_1 + S_2$ stroke at the same lever ratio.

In the structure of this invention relative to the exemplified embodiments, the push rod moves forward with the drive means until it meets resistance, and it is thence driven via a force amplifying lever to increase the force of the drive means, so that the stroke of the drive means does not become unnecessarily great. Therefore, a force increasing mechanism is provided, which is effective to make the device embodying the invention more compact.

I claim:

1. A force transfer mechanism for transmitting am input force with force multiplication comprising:
   (a) an actuator member movable from a retracted position to an operative position in response to said input force being applied to said actuator member;
   (b) a push rod;
   (c) means for frictionally connecting said push rod to said actuator member during movement of said actuator member from said retracted position until such time as said push rod encounters a resistance force greater than the frictional force of said connecting means;
   (d) a force lever angularly disposed relative to said push rod and engageable therewith at a point intermediate the ends thereof;
   (e) a fulcrum pin on which said force lever is rotatably mounted at its one end, another end of said force lever being engageable with said actuator member to transmit said input force from said actuator member to said push rod following such time as said push rod encounters said resistance force.

2. A force transfer mechanism as recited in claim 1, wherein a distance between said fulcrum pin and said point of engagement of said force lever with said push rod is less than another distance between said fulcrum pin and the point of engagement of said other end of said force lever with said actuator member.

3. A force transfer mechanism as recited in claim 1, further comprising:
   (a) said push rod having a toothed gear rack; and
   (b) said force lever having a toothed sector gear, the respective teeth of said gear rack and sector gear being adapted to mesh to provide said engagement between said force lever and said push rod.

4. A force transfer mechanism as recited in claim 3, further characterized in that one surface of the teeth of said gear rack is sloped relative to the axis of said push rod and the other surface is normal thereto, said sector gear teeth being correspondingly shaped.

5. A force transfer mechanism as recited in claim 4, further characterized in that said force lever has a normal position in which the teeth of said sector gear are disengaged from the teeth of said gear rack until such time as said force lever is rotated about said fulcrum pin by engagement of said actuator member with said other end thereof.

6. A force transfer mechanism as recited in claim 4, further characterized in that the sloped surface of the teeth of said gear rack and said sector gear are engaged prior to the time said actuator member engages said other end of said force lever.

7. A force transfer mechanism as recited in claim 6, further comprising means for supporting said fulcrum pin to permit disengagement of said sector gear teeth from said gear rack teeth in response to said engagement of said sloped surface of the respective gear rack and sector gear teeth during said movement of said actuator member from said retracted position prior to engaging said other end of said force lever.

8. A force transfer mechanism as recited in claim 7, wherein said force lever further comprises a boss at said one end thereof, said teeth of said sector gear being formed on the circumference of said boss.

9. A force transfer mechanism as recited in claim 8, wherein one of said means for supporting said fulcrum pin and said one end of said lever including said boss is formed with an oblong-shaped opening in which said fulcrum pin is provided with limited free movement in the direction of elongation of said oblong opening to permit said disengagement of said sector gear teeth from said gear rack teeth.

10. A force transfer mechanism as recited in claim 2, further comprising a roller rotatably connected to said other end of said force lever, said actuator member being engageable with said force lever through said roller.

11. A force transfer mechanism as recited in claim 10, further comprising a pin axle connecting said roller to said other end of said force lever, said pin axle lying in parallel relationship with said fulcrum pin.

* * * * *